United States Patent [19]

Ando et al.

[11] Patent Number: 4,736,688

[45] Date of Patent: Apr. 12, 1988

[54] HOOD DEVICE FOR COUPLING CARS

[75] Inventors: Rokuro Ando, Nagoya; Mikio Hatano, Kasugai, both of Japan

[73] Assignee: Narita Seisakusho Mfg., Ltd., Nagoya, Japan

[21] Appl. No.: 875,582

[22] Filed: Jun. 18, 1986

[30] Foreign Application Priority Data

Jun. 19, 1985 [JP]  Japan .............................. 60-93478[U]

[51] Int. Cl.⁴ ............................................. B61D 17/22
[52] U.S. Cl. ...................................... 105/17; 105/8.1; 105/18
[58] Field of Search .................... 105/8.1, 10, 15, 16, 105/17, 18, 21, 11

[56] References Cited

U.S. PATENT DOCUMENTS

| | | | |
|---|---|---|---|
| 1,074,731 | 10/1913 | Muhlfeld | 105/17 |
| 1,157,182 | 10/1915 | Russum | 105/17 |
| 1,167,973 | 1/1916 | Brown | 105/10 |
| 1,243,932 | 10/1917 | Gunn et al. | 105/17 |
| 1,431,707 | 10/1922 | Tatum | 105/21 X |
| 1,637,193 | 7/1927 | Koch | 105/8.1 X |
| 1,668,556 | 5/1928 | Glaenzer et al. | 105/8.1 X |
| 2,184,298 | 12/1939 | Groff | 105/8.1 X |
| 2,234,059 | 3/1941 | Nystrom | 105/21 X |
| 3,410,226 | 11/1968 | Krupp | 105/21 X |
| 4,252,065 | 2/1981 | Bickel et al. | |

FOREIGN PATENT DOCUMENTS

| | | | |
|---|---|---|---|
| 461089 | 6/1928 | Fed. Rep. of Germany | 105/8.1 |
| 8023409 | 4/1982 | France . | |
| 307443 | 5/1933 | Italy | 105/8.1 |
| 59-41426 | 6/1984 | Japan . | |
| 524497 | 8/1972 | Switzerland . | |
| 964210 | 7/1964 | United Kingdom | 105/21 |
| A2009691 | 6/1979 | United Kingdom . | |
| 765070 | 9/1980 | U.S.S.R. | 105/15 |

*Primary Examiner*—Kenneth J. Dorner
*Assistant Examiner*—Thomas A. Rendos
*Attorney, Agent, or Firm*—Leydig, Voit & Mayer

[57] ABSTRACT

A hood device for coupling cars comprises a first hood component having one end secured to one of a pair of car bodies to be coupled with each other and a second hood component having one end secured to the other car body and the other end adapted to be coupled with the other end of the first hood component, each of the hood components having side wall panels provided on both side portions thereof. Each side wall panels includes a fixed side wall panel having one end secured to the other end of the associated hood component, and a movable side wall panel having one end mounted on the associated car body and adapted to be turnable about a substantially vertical axis and the other end resiliently urged such as to be directed to the inner surface of the adjacent fixed side wall panel. The movable side wall panel has a roller at the other end thereof which is supported in such a manner that it can be rolled on the inner surface of the fixed side wall panel in the longitudinal direction of the car bodies and displaced by a predetermined amount in the vertical direction, thereby assuring smooth sliding movement between the fixed and movable side wall panels following variable running conditions of the cars.

5 Claims, 10 Drawing Sheets

HOOD DEVICE FOR COUPLING CARS

BACKGROUND OF THE INVENTION

1. Field of the Invention

The present invention relates to a hood device for use in coupling railway cars or the like.

2. Description of the Prior Art

It has heretofore been known that a hood device for coupling cars incorporates a combination hood component divided into two parts in the longitudinal direction of the two car bodies to be coupled, thereby constituting a first hood component having one end secured to one car body and a second hood component having one end secured to the other car body, the other ends of both hood components being connected to each other when the car bodies are coupled together. Side panels are provided in both side portions of each of the hood components. Such a hood device for coupling cars is disclosed, by way of example, in Japanese Patent Publication No. 41426/1984.

In the conventional hood device using a pair of divided hood components as mentioned above, it is necessary for the side panels for both hood components to follow the running state of the cars which may include such movements as rolling, pitching or passing around bends.

SUMMARY OF THE INVENTION

It is an object of the present invention to provide a hood device of the above-described type for coupling cars in which each side panel can be made suitable for any of the running conditions which the cars are likely to experience.

More specifically, in accordance with the present invention, there is provided a hood device for coupling cars which comprises: a first hood component having one end secured to one of a pair of car bodies which are to be coupled together; a second hood component having one end secured to the other of the pair of car bodies and the other end adapted to be coupled with the other end of the first hood component, each of the hood components having side wall panels disposed internally at both side portions thereof: wherein each of the side wall panels comprises a fixed side wall panel having one end secured to the other end of the associated hood component, and a movable side wall panel having one end mounted on the associated car body and adapted to be turnable about a vertical axis and the other end resiliently urged toward the inner surface of the fixed side wall panel; the movable side wall panel having a roller at the other end thereof which is supported through the intermediary of a support means in such a manner that the support means allows the roller to roll on the inner surface of the fixed panel in the longitudinal direction of the car and to be displaced in the vertical direction by a predetermined amount.

Other objects, features and advantages of the present invention will be more apparent from the following description of a preferred embodiment with reference to the accompanying drawings.

DESCRIPTION OF THE PREFERRED EMBODIMENT

There will now be described an embodiment of the invention which is illustrated in the drawings.

Figure 1:
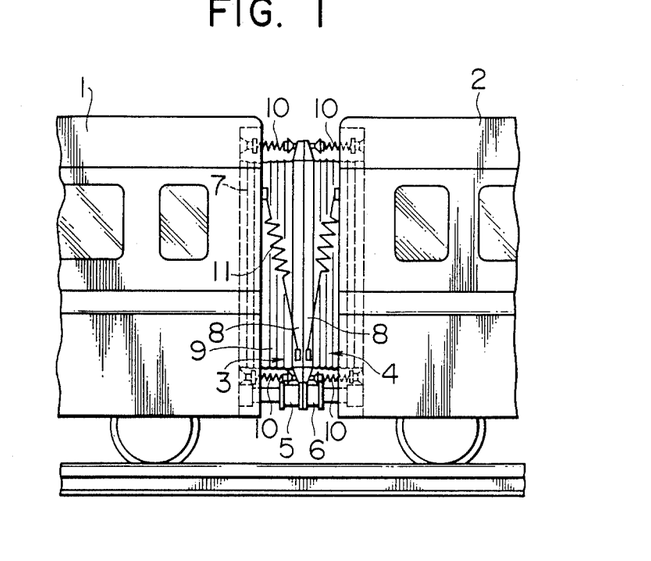
FIG. 1 is a side view of a hood device for coupling cars according to an embodiment of the present invention with the hood device mounted on car bodies which has been coupled together.

Referring to FIG. 1, two car bodies to be coupled with each other are designated by reference numerals 1, 2. As shown, a pair of first and second hood components 3, 4 divided in the longitudinal direction of the car bodies are mounted between the opposing end faces of the car bodies, and each have a body side metal frame secured to the end face of the associated car body. The hood components 3, 4 are separated from each other at their mutually opposing faces when the car bodies are moved apart away from each other on decoupling a pair of couplers 5, 6. When the couplers 5, 6 are coupled with each other, the hood components 3, 4 are pushed together and are connected to each other at their mutually opposing faces so as to cover the circumference of a through passage connecting the two car bodies. Each of the hood components 3, 4 has a hood member 9 including a hood frame-work and hood cloth capable of expansion and contraction, the hood member 9 being disposed between a fixed side metal frame 7 secured to the end face of the associated car body and an open side metal frame 8 serving as a free end, as well as a hood pushing unit 10 for urging the open side metal frame 8 forwardly by virtue of resilient force, this hood pushing unit 10 being disposed between the end face of the associated car body and the open side metal frame 8. When the car bodies 1, 2 are coupled, the open end metal frames 8, 8 of both hood components 3, 4 are pushed against and connected to each other by means of the hood pushing units 10, 10. Designated at reference numeral 11 is a hood sling. Within each of the hood components 3, 4 are provided panels adapted to surround the through passage at its ceiling portion and both side wall portions, the arrangement being as follows. Note that because both the hood components 3, 4 have the same panel construction, description will be restricted mainly to the first hood component 3.

Figure 2:
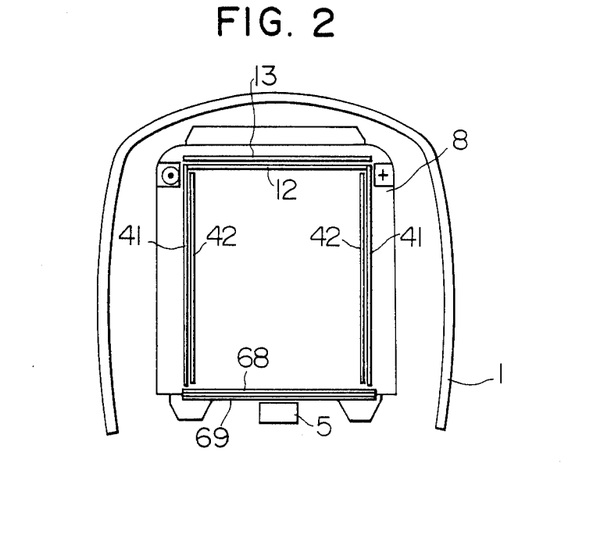
FIG. 2 is a view of one hood component of the hood device as seen from the rear side toward the front of the car.
Figure 4:
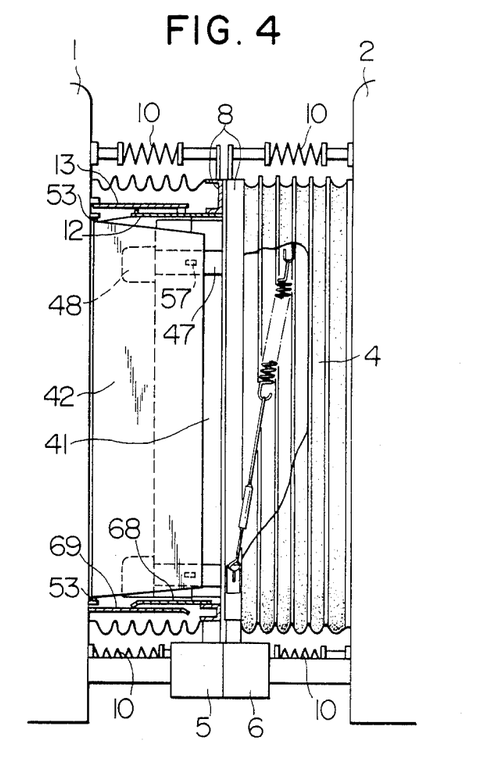
FIG. 4 is an enlarged side view, partially sectioned, of the hood device of FIG. 1.
Figure 5:
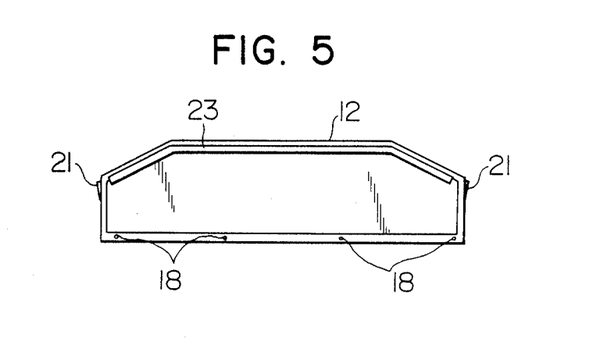
FIG. 5 is a plan view of a fixed ceiling panel.
Figure 6:
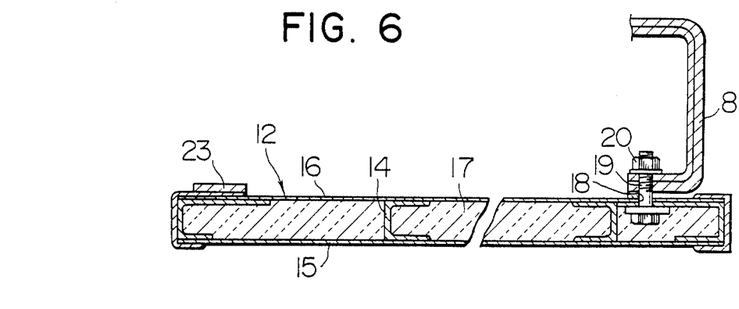
FIG. 6 is a side sectional view of the fixed ceiling panel of FIG. 5.
Figure 7:
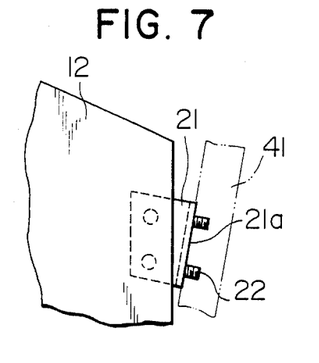
FIG. 7 is a partially top view of the section connecting the fixed ceiling panel and a fixed side wall panel.
Figure 8:
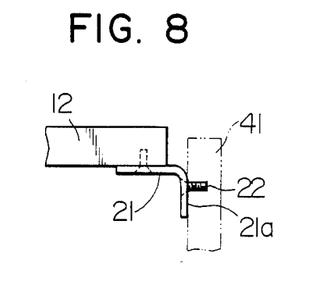
FIG. 8 is a front sectional view of the connecting section of FIG. 7.

First, a ceiling panel is constructed in separable fashion such that, as shown in FIGS. 2 and 4, it comprises a fixed ceiling panel 12 secured at its right end (as viewed in FIG. 4) to the open side metal frame 8 of the hood component 3 and extending in the horizontal direction, and a movable ceiling panel 13 secured at its left end (as viewed in FIG. 4) to the end face of the car body 1 and extending in the horizontal direction so that it partially lies over the panel 12. The fixed ceiling panel 12 has a longitudinal length which, as shown in FIG. 4, is more than half that of the hood component 3 in a normal running state, and which does not interfere with the expansion and contraction of the hood. The fixed ceiling panel 12 has a width which enables it to cover the ceiling portion of the through passage and yet which ensures that it does not make contact with the hood cloth when the lateral displacement of the panel 12 relative to the hood cloth is caused during running of the cars. The fixed ceiling panel 12 has a substantially trapezoidal plan configuration as shown in FIG. 5, and the proximal end thereof, i.e., the base of the trapezoid is secured to the metal frame 8. As shown in FIG. 6, the fixed ceiling panel 12 is so structured that an inner plate 15 of decorative aluminum and melamine laminate and an outer plate 16 made of aluminum are bonded to the sides of a framework 14 made of light metal which face the interior and exterior of the through passage, respectively, so that the surrounding wall of the through passage has as attractive an appearance as the interior of the car. A space defined between the inner and outer plates 15, 16 is filled with a sound and heat insulating material 17, so as to effect sound and heat insulations. The fixed ceiling panel 12 is provided at its proximal end with four bolt holes 18, as shown in FIG. 5, through which the fixed ceiling panel 12 is horizontally secured to the open end metal frame 8 by means of bolts 19 and nuts 20, as shown in FIG. 6. A mounting plate 21 is secured to each side of the fixed ceiling panel 12 by means of which the latter 12 is integrally secured to a fixed side wall panel 41 to be described later. As shown in FIGS. 7 and 8, the mounting plate 21 has a substantially L-shaped side configuration. As seen from above, a face 21a on which the side wall panel 41 is mounted is slanted relative to the fixed ceiling panel 12 in such a manner that the gap between the fixed ceiling panel 12 and the fixed side wall panel 41 is enlarged toward the car body. The fixed side wall panel 41 is secured to the mounting plate through a mounting bolt 22. A sliding plate 23 made of synthetic resin is secured to the proximal and upper end of the fixed ceiling panel 12 so as to allow easy sliding of the fixed and movable ceiling panels 12, 13 against each other when the movable ceiling panel 13 to be described later abuts against the fixed ceiling panel 12 on pitching of car bodies, thereby protecting both panels.

Figure 9:
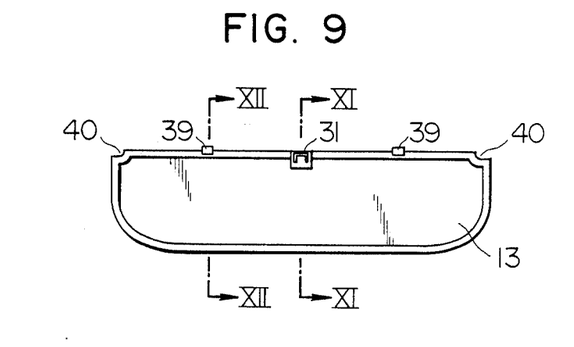
FIG. 9 is a plan view of a movable ceiling panel.

The movable ceiling panel 13 will now be described below. The movable ceiling panel 13 has a trapezoidal plan configuration, as shown in FIG. 9, each side thereof which interconnects the base and top side of the trapezoid being curved, and has longitudinal and lateral dimensions which are substantially the same as those of the fixed ceiling panel 12.

Figure 10:
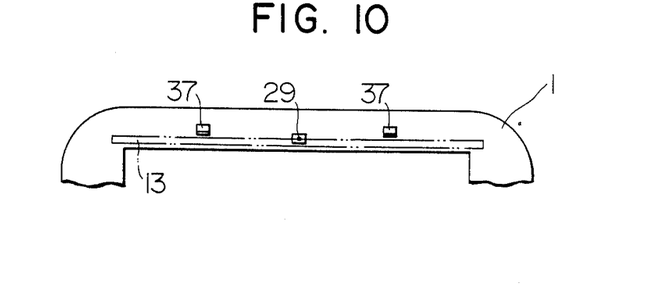
FIG. 10 is a front view of the movable ceiling panel, showing how it is mounted on the end face of a car body.
Figure 11:
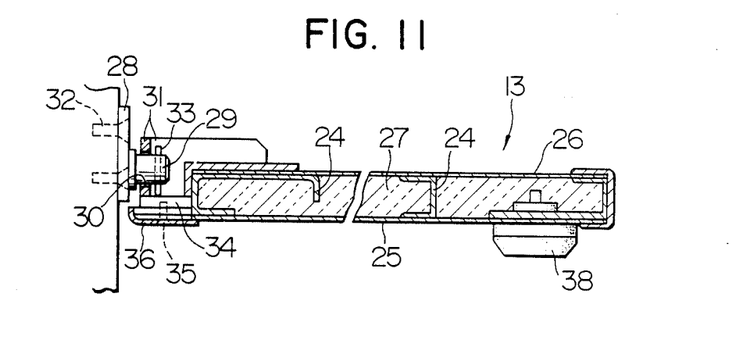
FIG. 11 is an enlarged view taken along the line XI—XI of FIG. 9.
Figure 12:
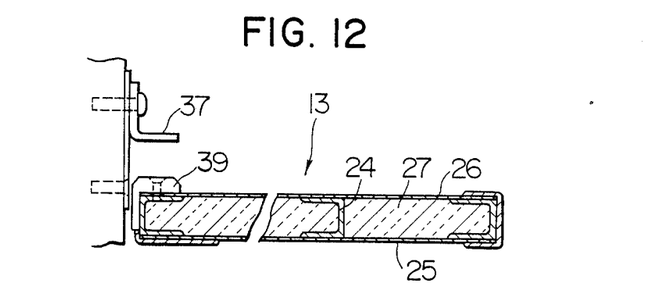
FIG. 12 is an enlarged view taken along the line XII—XII of FIG. 9.
Figure 13:
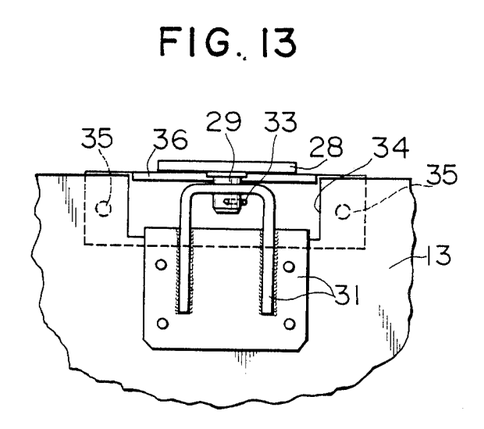
FIGS. 13 and 14 are front and rear views of a portion of the movable ceiling panel, respectively mounted on the car body, respectively.
Figure 14:
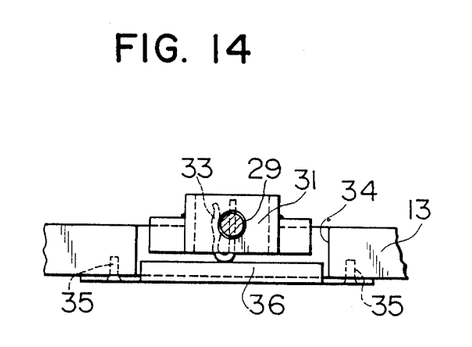

As shown in FIGS. 11 and 12, the movable ceiling panel 13 is constructed in a similar manner to that employed in the fixed ceiling panel 12 with a framework 24, an inner plate 25, an outer plate 26 and a sound and heat insulating material 27. The movable ceiling panel 13 is rotatably or swingably supported at its laterally central position by the car body in such a manner that it may be rocked or swung to cause substantially vertical movement of both side portions of the panel 13. More specifically, as shown in FIGS. 9 to 14, a rotation shaft 29 is mounted through a washer 28 to the car body 1 in such a manner as to protrude in the horizontal direction. The washer 28 is attached to the car body 1 by fasteners 32. A guide plate 31 having a hole 30 into which the shaft 29 is loosely fitted is secured to the central portion of the proximal end of the movable ceiling panel 13 by means of a bolt. The shaft 29 is rotationally passed through the hole 30, and a snap pin 33 is inserted into the distal end of the shaft. The hole 30 has a slightly larger diameter than that of the shaft 29, so that the movable ceiling panel 13 can be slightly moved in the vertical direction. An operation window 34 is formed on the movable ceiling panel 13 at a position where the shaft 29 is disposed by cutting away the corresponding portion of the panel 13. The bottom side of the operation window 34 is closed by means of a cover 36 detachably mounted on the window 34 by a plurality of fasteners 35. The snap pin 33 can be mounted or dismounted through the operation window 34 by removing the cover 36, so that the movable ceiling panel 13 may thus be mounted or removed. As shown in FIGS. 10 to 12, a stopper 37 for limiting the rolling range of the movable ceiling panel 13 is secured on the end face of the car body 1 at each side of the shaft 29. Both stoppers 37 are mounted, as shown in FIG. 10, at a position which is slightly above the upper surface of the movable ceiling panel 13 facing the panel 13 when the movable ceiling panel 13 lies horizontally. Therefore, the movable ceiling panel 13 can roll about the shaft 29, while the rolling range of the ceiling panel 13 is limited. Designated at reference numeral 38 is a slide member made of synthetic resin which is secured to the bottom surface of the movable ceiling panel 13 at its front portion. The movable ceiling panel 13 is placed above the fixed ceiling panel 12 through the member 38, so that sliding of both panels against each other is smooth.

Reference numerals 39, 39 are slide members made of synthetic resin which are secured to both sides of the proximal end of the movable ceiling panel 13, as shown in FIGS. 9 to 12. Smooth rotation of the movable ceiling panel is effected when the members 39, 39 abut against the end face of the car body 1.

Notches 40, 40 are provided at both sides of the proximal end of the movable ceiling panel 13 for receiving hinge members 53 of movable side wall panels 42.

Figure 3:
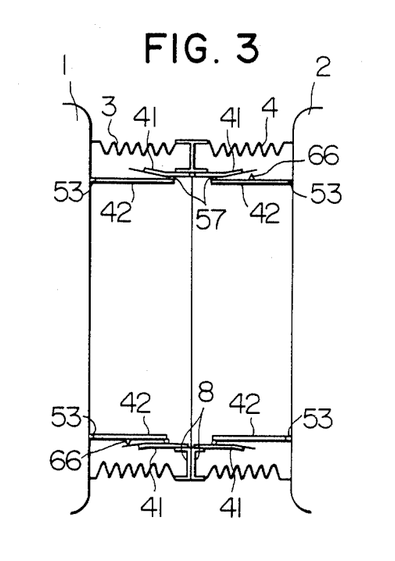
FIG. 3 is a schematic sectional view of the hood component as seen from above.
Figure 15:
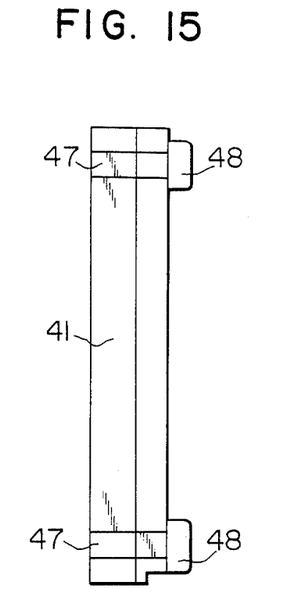
FIG. 15 is a side view of the inner side of the fixed side wall panel.
Figure 16:
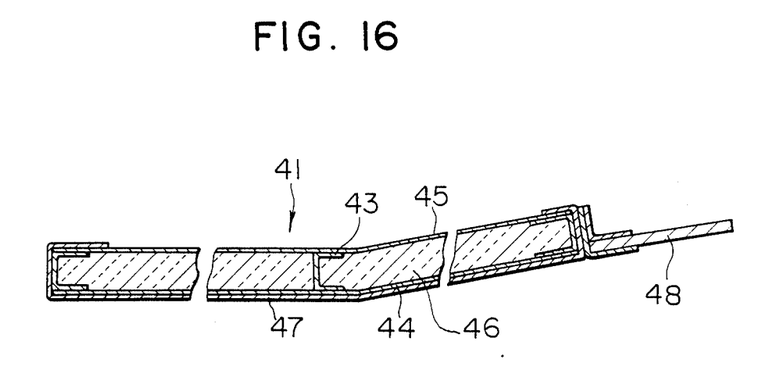
FIG. 16 is a cross-sectional view of the fixed side wall panel.

The side wall panels will now be described. As shown in FIGS. 2 and 3, each side wall panel is constructed such as to be separable and comprises a fixed side wall panel 41 secured at one end thereof to the open end metal frame 8 of the hood component 3 or 4 and a movable side wall panel 42 mounted at one end thereof to the associated car body and adapted to be turnable about a substantially vertical axis, the individual side wall panels being disposed on each of both sides of the through passage. First, fixed side wall panel 41 of the hood component 3 will be described. As described above, the hood components 3 and 4 have a similar side wall panel construction, so description will be restricted mainly to one of the side wall panels of the hood component 3. As shown in FIGS. 3 and 15, the fixed side wall panel 41 has a longitudinal length which is substantially half that of the hood component 3 in its normal state, and is formed into a rectangular shape having a vertical length substantially equal to that of the hood component 3, with its base end (the rightward end as viewed in FIG. 3) being secured to the open side metal frame 8 by means of bolts or the like. Also, as shown in FIG. 3 and 16, the front half portion, when seen from above, of the fixed side wall panel, i.e., the free end portion thereof extending substantially from the center is bent outwardly. In the same manner as with the ceiling panel, the fixed side wall panel 41 is so constructed that, as shown in FIG. 16, an inner plate 44 and an outer plate 45 which respectively face the interior and exterior of the through passage are secured to the sides of a framework 43, and the space defined between the inner and outer plates 44 and 45 is filled with a sound and heat insulating material 46. A pair of slide guide plates 47 are bonded to the upper and lower portions of the inner plate 44 on the surface thereof which faces the interior of the through passage and over the entire length thereof in the longitudinal direction. A slip-off prevention plate 48 formed of a flexible material such as a hard rubber plate is secured to the front end, i.e., free end, of the fixed side wall panel 41 and projects therefrom. The front portion, i.e., the bent portion of the fixed side wall panel 41 is secured to the mounting plate 21 fixed to each side of the fixed ceiling panel 12, as shown in FIGS. 7 and 8, so that the fixed side wall panel 41 and the fixed ceiling panel 12 are integrated.

Figure 17:
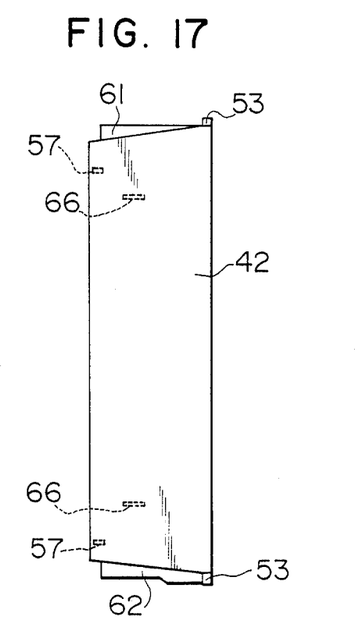
FIG. 17 is a side view of the inner side of the movable side wall panel.
Figure 18:
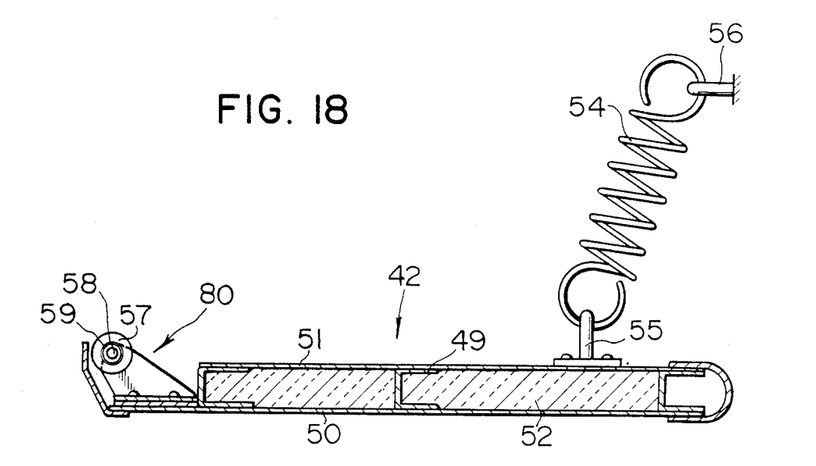
FIG. 18 is a cross-sectional view of the movable side wall panel.
Figure 19:
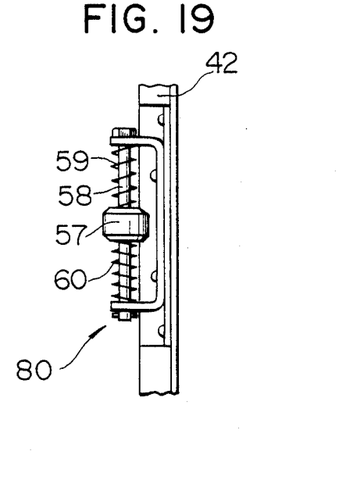
FIG. 19 shows a roller provided on the movable side wall panel.
Figure 20:
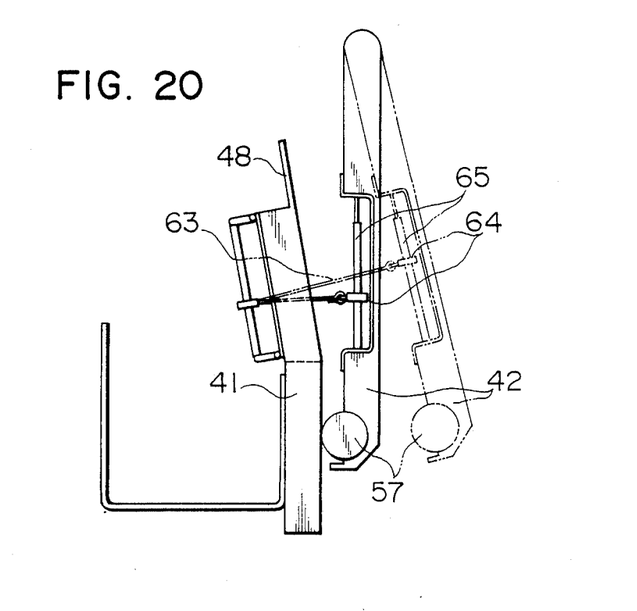
FIGS. 20 and 21 are plan sectional and front sectional views of the safety device of the side wall panel, respectively.
Figure 21:
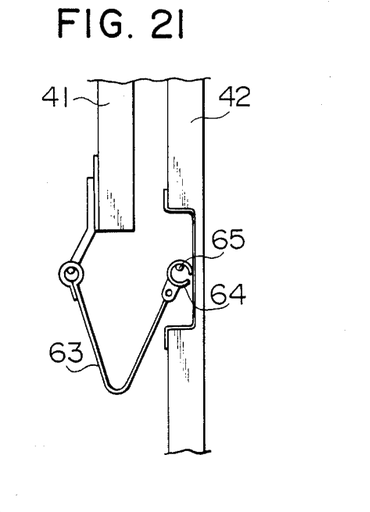

Next, the movable side wall panel 42 of the hood component 3 will be described. As shown in FIG. 3, the movable side wall panel 42 is disposed inside the fixed side wall panel 41, and has its base end (left end as viewed in FIG. 3) mounted on the car body in such a manner as to be turnable about a substantially vertical axis. The longitudinal length of the movable side wall panel 42 is so selected that its distal end (right end as seen in FIG. 3) reaches the rectilinear portion of the fixed side wall panel 41, whereas the height thereof is so made as it extends between the inner surface of the fixed ceiling panel 12 and the upper surface of a floor plate. Further, the movable side wall panel 42 has the side configuration shown in FIG. 17. The movable side wall panel 42 is constructed by a framework 49, an inner plate 50, an outer plate 51 and a sound and heat insulating material 52 which are made of the same materials as those of the fixed side wall panel 41, as shown in FIG. 18. Designated at reference numeral 53 is a hinge member for attaching the movable side wall panel 42 to the car body in such a manner as to be turnable about a substantially vertical axis. Designated at 54 is a spring for resiliently urging the movable side wall panel 42 such as to be pushed at the distal end thereof against the inner surface of the fixed side wall panel 41. The spring is disposed between a hook 55 provided on the outer surface of the movable side wall panel 42 and a hook 56 provided on the car body. Designated at reference numeral 57 is a roller provided through a supporting means 80 at the distal end of the movable side wall panel 42 on the outer side thereof, while two rollers are disposed at vertically spaced apart positions for abutment with the upper and lower slide guide plates 47 bonded to the fixed side wall panel 41, so that each roller 57 is rolled over the slide guide plate 47 as the fixed side wall panel 41 is moved back and forth. As shown in FIG. 19, the roller 57 is loosely fitted onto a roller shaft 58 fixedly mounted on the movable side wall panel 42 in the vertical direction thereof in such a manner that the roller can be moved in the vertical direction. Coil springs 59, 60 made of resilient material are provided on the roller shaft 58 on either side of the roller 57, so that the latter can be moved in the vertical as well as horizontal directions of the panel. The roller shaft 58 and the springs 59, 60 together constitute the supporting means 80, and the springs 59, 60 urge the roller 57 toward a predetermined position on the roller shaft 58, i.e., the substantial center of the axis of the roller shaft 58. Blocking plates 61, 62 made of resilient plate, such as a rubber plate, protrudes from the upper and lower ends of the movable side wall panel 42, respectively, as shown in FIG. 17, so that the upper blocking plate 61 blocks the gap formed between the fixed ceiling panel 12 and the movable side wall panel 42, whereas the lower blocking member 62 blocks the gap formed between the floor plate and the movable side wall panel 42. As shown in FIGS. 20 and 21, a rope 63 is mounted between the movable side wall panel 42 and the fixed side wall panel 41 so as to limit the movement of the movable side wall panel 42 so that the free end, i.e., the end of the movable side wall panel 42 where the rollers 57 are mounted, is moved inwardly by no more than a predetermined amount, thereby safely preventing a child from entering the gap between two panels.

Figure 22:
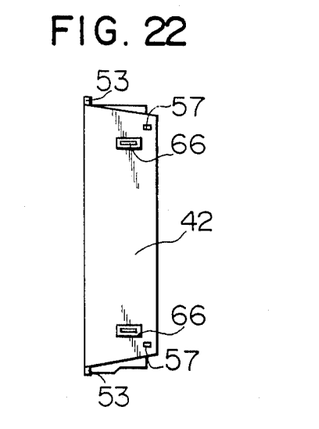
FIG. 22 is a side view of the outer surface of the movable side wall panel.
Figure 23:
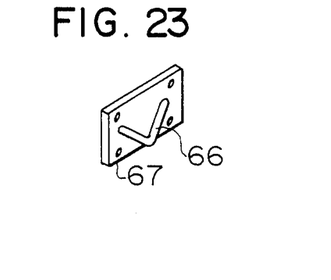
FIG. 23 is a perspective view of an interference prevention member.

The rope 63 is hooked on a metal fitting 64 having a hook which is provided on the end of the movable side wall panel 42. This latch 64 is detachably hooked onto a support rod 65, so that the movable side wall panel 42 can be opened when an operator inserts his hand into the gap between the two panels and unlatches the metal fitting 64. The movable side wall panel 42 includes a pair of interference prevention members 66 secured onto the outer surface thereof in vertically spaced apart positions, each of which members 66 is constituted in the form of a projection which projects outwardly, as shown in FIGS. 3, 22 and 23. Each interference prevention member 66 is so constructed that, as shown in FIG. 23, a bar material is bent into a substantially triangular configuration in plan view, and this is secured to a base plate 67, the base plate 67 in turn being secured to the outer surface of the movable side wall panel 42. The pair of interference prevention members 66 are provided on only one of the movable side wall panels 42, 42 of the hood components 3, 4 which are located opposite to and in alignment with each other in the longitudinal direction of the car bodies. Immediately before the distal ends of both the opposite movable side wall panels 42, 42 collide with each other, the pair of interference prevention members 66 ride over the rectilinear portion of the adjacent fixed side wall panel 41, thereby causing the distal end of the movable side wall panel 42 having the interference prevention members 66 to be deflected inwardly of the other movable side wall panel 42 disposed opposite to and in alignment with it. The floor plate is divided, as shown in FIGS. 2 and 4, into a front floor plate 68 and a rear floor plate 69 disposed in the longitudinal direction of the cars in both hood components. The interior of each plate is filled with a sound and heat insulating material, as are the panels.

Operation of this embodiment will now be described. In a normal condition where the car bodies 1, 2 are coupled with each other and are running on a straight stretch of railroad, the fixed ceiling panels 12 lie horizontally, and the movable ceiling panels 13 are placed above and parallel to the fixed ceiling panels 12 (as shown in FIGS. 2 and 4). The respective fixed side wall panels 41 are arranged, as shown in FIG. 3, parallel to the lontidudinal center axis of the car bodies, while the respective movable side wall panels 42 are likewise positioned parallel to the longitudinal center axis with their distal ends located in contact with the inner surfaces of the adjacent fixed side wall panels 41. Further, the gaps between the ceiling panel and the floor plate of each hood component are covered by the blocking plates 61, 62 provided on upper and lower ends of each movable side wall panel 42, respectively, thereby preventing wind from entering the interior of the car bodies.

As each panel is filled with sound and heat insulating material, the interior of the through passage is sound and heat insulated.

Figure 24:
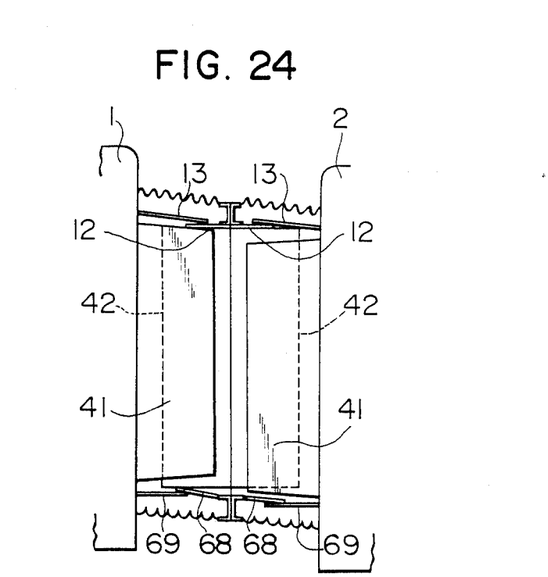
FIG. 24 is a schematic side sectional view of the hood device, showing how each section is arranged when car bodies are pitching.

When the car bodies 1, 2 are subjected to pitching, as shown in FIG. 24, the movable ceiling panel 13 which is located at a higher position is slanted, with the distal end thereof being lower, whereas the movable ceiling panel 13 which is located at a lower position is slanted with the distal end thereof being raised, thereby staying in conformity with the movement caused by the pitching. This movement is possible because the inner diameter of each hole 30 is slightly larger than the outer diameter of each shaft 29, and each shaft 29 is loosely retained in the corresponding hole 30. The side wall panels follow the movement caused by the pitching with their fixed side wall panels 41 and the movable side wall panels 42 being vertically displaced relative to each other. At this time, since the rollers 57 provided on each movable side wall panel 42 are pushed against the slide guide plates 47 on associated fixed side wall panel 41 by virtue of the load generated by the spring 54, the rollers 57 are moved in the vertical direction against the coil springs 59, 60, thereby effecting smooth displacement of both panels 41, 42 relative to each other.

Figure 25:
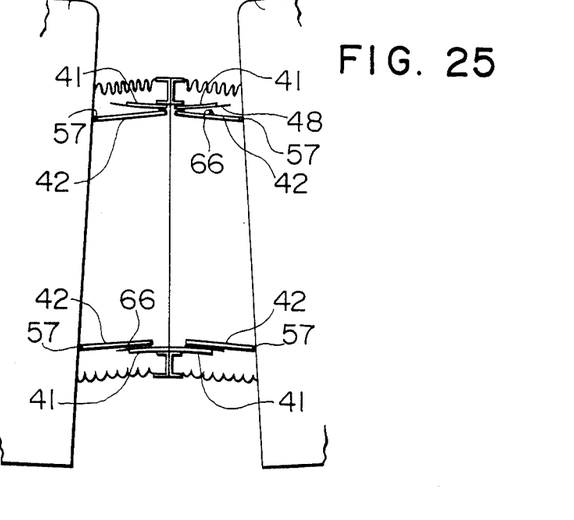
FIG. 25 is a schematic plan sectional view of the hood device, showing how each section thereof is arranged when car bodies are passing a bend.

When the car bodies 1, 2 pass around a curve in the railroad, the ceiling panels follow the bend with their fixed ceiling panels 12 and movable ceiling panels 13 being displaced in the lateral direction of car bodies relative to each other. As shown in FIG. 25, the movable side wall panels 42 are each turned in the horizontal direction about the hinge members 53, thereby following lateral movements of the fixed side wall panels 41 to cope with the passage of the car bodies around the curve. At this time, because the rollers 57 of the movable side wall panels 42 are rolled on the slide guide plates 47 of the fixed side wall panels 41, relative displacement between the movable and fixed side wall panels is effected smoothly.

When the car bodies 1, 2 are subjected to rolling, the movable ceiling panels 13 roll about their shafts 29 in order to follow the rolling of the fixed ceiling panels 12. Further, the fixed side wall panels 41 and the movable side wall panels 42 are displaced relative to each other, thereby allowing each panel to follow the rolling of the car bodies.

Figure 26:
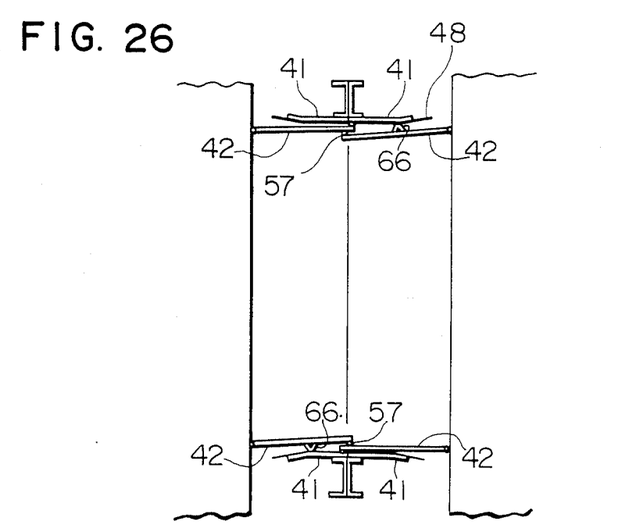
FIG. 26 is a schematic plan sectional view of the movable side wall panels which are interferring with each other.

When the hood components are contracted to such an extent that the opposing movable side wall panels 42 tend to cause their interference and collision, the interference prevention members 66 ride over the inner surface of the rectilinear portion of the adjacent fixed side wall panel 41, as shown in FIG. 26, causing the distal end of the movable side wall panel 42 having the interference prevention members 66 to be deflected inwardly of the distal end of the other movable side wall panel 42 opposite to it, thereby preventing any damage of the movable side wall panels 42 occurring due to collision between them.

Further, the longitudinal length of the fixed side wall panels 41 are reduced by the provision of the protruding slip-off prevention plates 48 (see FIG. 16). Therefore, when the car bodies approach each other abnormally, when passing around a curve, for example, damage to the car bodies and particularly the distal ends of the fixed side wall panels 41 due to collision between the distal ends in question and the car bodies can be prevented. Further, when the distal ends of the movable side wall panels 42 slip out of the distal ends of the fixed side wall panels 41 due to abnormal extension of the hook components, the rollers 57 on the movable side wall panels are supported on the slip-off prevention plates 48, so that the engagement between the two panels 41 and 42 will not be released. When the car bodies approach each other abnormally, the slip-off prevention plates 48 may collide with the car bodies. However, since the slip-off prevention plates 48 are made of resilient material, they may become bent but do not break.

According to the present invention, as fully described above, it becomes possible for side wall panels to cope with any movement of the car bodies whatever the running state thereof, including rolling, pitching and passing around bends in a railroad. In particular, because of the provision of the rollers 57 which can be rolled in the vertical as well as longitudinal direction, smooth sliding can be ensured when the fixed and movable side wall panels are displaced relative to each other in the vertical as well as longitudinal direction.

What is claimed is:

1. A hood device for coupling cars comprising a first hood component having one end secured to one of a pair of car bodies to be coupled with each other; and a second hood component having one end secured to the other of said pair of car bodies and the other end facing the other end of said first hood component; each of said hood components having side wall panels provided on both side portions thereof:

wherein each of said side wall panels comprises a fixed side wall panel having one end secured to the other end of the associated hood component, said fixed side wall having an inner surface with respect to the interior of said hood components, and a movable side wall panel having one end mounted on the associated car body and substantially pivotable about a vertical axis and the other end resiliently urged such as to be directed to the inner surface of said adjacent fixed side wall panel, and said movable side wall panel has a roller at said other end thereof which is supported by means of a supporting means, said supporting means supporting said roller (a) for rotation such that said roller can be rolled on the inner surface of said fixed side wall panel in the longitudinal direction of the car bodies and (b) for vertical displacement such that said roller can be displaced by a predetermined amount in the vertical direction.

2. A hood device for coupling cars according to claim 1 wherein said fixed side wall panel of each of said side wall panel includes a slip-off prevention plate made of resilient material which prevents damage of the fixed side wall panel and the car body even they collide with each other due to contraction of the hood components beyond a predetermined amount, said slip-off preventing plate extending from a free end of said fixed side wall panel toward the facing car body, such that when said hood components are extending by more than a predetermined amount said roller is engaged with said slip-off prevention plate.

3. A hood device for coupling cars according to claim 1 wherein a safety means is provided for limiting the movement of said movable side wall panel relative to said fixed side wall panel such that said other end of said movable side wall panel can pivot away from said fixed side wall panel by no more than a predetermined amount.

4. A hood device for coupling cars according to claim 3, wherein said safety means is a rope for interconnecting said fixed side wall panel and said movable side wall panel.

5. A hood device for coupling cars comprising:

a first hood component having one end secured to one of a pair of car bodies to be coupled with each other; and a second hood component having one end secured to the other of said pair of car bodies and the other end facing the other end of said first hood component; each of said hood components having side wall panels provided on both side portions thereof, each of said side wall panels having a fixed side wall panel having one end secured to the other end of the associated hood component, said fixed side wall having an inner surface with respect to the interior of said hood components, and a movable side wall panel having one end mounted on the associated car body and substantially turnable about a vertical axis and the other end resiliently urged such as to be directed to an inner surface of said adjacent fixed side wall panel, said movable side wall panel having a roller at said other end thereof which is supported by means of a supporting means, said supporting means having a roller shaft extending in the vertical direction and secured to said movable side wall panel and supporting said roller such that said roller can be (a) rolled on said fixed side wall panel in the longitudinal direction of the car bodies and (b) displaced by a predetermined amount in the vertical direction, and resilient members for resiliently urging said roller toward a predetermined position on said roller shaft, said resilient members being provided above and below said roller.

* * * * *